Figure 1:
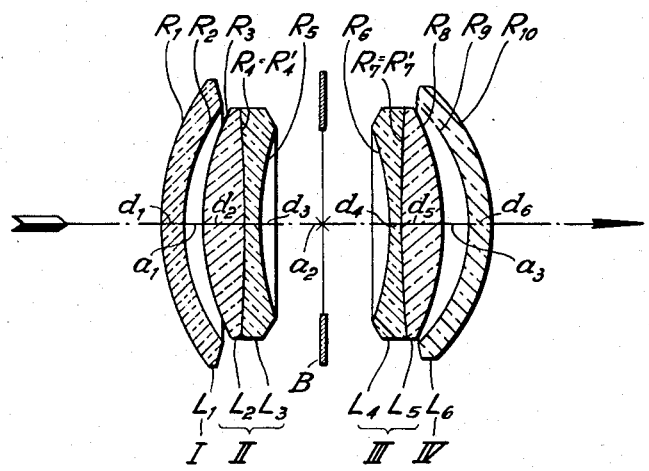

Jan. 10, 1956  A. W. TRONNIER  2,730,015
FOUR COMPONENT WIDE ANGLE PHOTOGRAPHIC OBJECTIVE
CONSISTING OF SIX LENS ELEMENTS
Filed May 28, 1953

INVENTOR
ALBRECHT WILHELM TRONNIER
By MOCK & BLUM
ATTORNEYS

United States Patent Office 2,730,015
Patented Jan. 10, 1956

2,730,015

FOUR COMPONENT WIDE ANGLE PHOTOGRAPHIC OBJECTIVE CONSISTING OF SIX LENS ELEMENTS

Albrecht Wilhelm Tronnier, Gottingen, Germany, assignor to Voigtländer, A. G., Braunschweig, Germany, a corporation of Germany Application May 28, 1953, Serial No. 357,997

Claims priority, application Germany June 11, 1952

7 Claims. (Cl. 88—57)

This invention relates to wide angle field photographic objectives of high light-transmitting capacity, consisting of six lenses, which are arranged on both sides of a centrally located diaphragm in such manner that said diaphragm is enclosed by two cemented lens members having a converging effect, each of said members, i. e. the member on the object side and the member on the image side being followed in outward direction by a diverging lens. On both sides of the diaphragm, the outer lens member, as well as the cemented lens member have the form of menisci and the glass-air-surfaces are concave toward the enclosed diaphragm so that all lens surfaces, which are in contact with air, of the total objective, show concave curvature in the direction of the diaphragm. Objectives of this structural design have been known as so-called double anastigmats and they have been successfully used for taking technical pictures. Conventional objectives of this type have a maximum relative aperture of about 1:6.8 and their effective anastigmatically flattened image field amount to about 65°.

The object of the present invention is to provide a new and improved modification of the beforementioned double anastigmats, the anastigmatically flattened effective image field of which can be extended to more than 75° and the relative aperture of which can be increased beyond 1:5.

In the new objective embodying the present invention, the two lens members enclosing the diaphragm are each formed by a diverging lens of unequal curvature ($L_3$ and $L_4$) which is followed in outward directions from the diaphragm by a converging lens of likewise unequal curvature ($L_2$ and $L_5$), these lenses $L_3$, $L_2$, and $L_4$, $L_5$, respectively, being united by a converging cemented surface ($R_4$, $R'_4$ and $R_7$, $R'_7$) to converging, meniscus-shaped cemented members (II and III). These cemented members II and III, are separated from the outer diverging, meniscus-shaped lenses I and IV, respectively, which are concave relative to the diaphragm, by air spaces $a_1$ and $a_3$, respectively. These air spaces have the design of meniscus-shaped converging lenses, which are likewise concave relative to the diaphragm. The limiting surfaces of these air spaces are curved in such manner that the difference of their radii, i. e. $R_3$—$R_2$ and $R_8$—$R_9$ meets the following conditions: the difference of radii $R_3$—$R_2$ is larger than 15% of the length of radius $R_2$ of the diverging surface turned toward the diaphragm, of meniscus-shaped outer lens $L_1$, but does not exceed 85% of the length of $R_2$; in a similar manner, the difference of radii $R_8$—$R_9$ is larger than 15% of the length of radius $R_9$ of the diverging surface turned toward the diaphragm, of meniscus-shaped outer lens $L_8$, but does not exceed 85% of the length of $R_9$. Expressed by a formula this means:

$$\frac{R_3-R_2}{R_2}>0.150 \text{ and } \frac{R_8-R_9}{R_9}>0.150$$

and $$\frac{R_3-R_2}{R_2}<0.850 \text{ and } \frac{R_8-R_9}{R_9}<0.850$$

The above condition is applied according to the invention to both halves of the objective (denoted I, II and III, IV in the drawing) whereby, in contrast to strictly symmetric structures, double anastigmat constructions result, the light-transmitting capacity of which is essentially increased in comparison with structures corresponding to the state of the art.

If in such objectives embodying the present invention, meeting of the sinus coincidence condition in particularly satisfactory manner is desirable, this can be attained in particularly simple manner by selecting the curvature of the meniscus-shaped diverging outer lens $L_8$, which limits the total objective on the side of the minor conjugate, in such manner that the radii of curvature $R_9$, $R_{10}$ of this lens are shorter than the corresponding radii of curvature $R_1$ and $R_2$ of the outer meniscus-shaped, diverging lens $L_1$, which limits the total objective on the side of the major conjugate. As described further below, this shortening of the radii of curvature $R_9$, $R_{10}$ of outer lens $L_8$ located on the image side, can be increased to such extent that a curvature of individual lens $L_8$ on the side of the minor conjugate, is obtained, at which its longer radius $R_{10}$ is smaller than radius $R_2$ of the most strongly curved surface of outer individual lens $L_1$, which limits the total objective on the side of the major conjugate.

The effective image field of double anastigmats according to the present invention can be further increased to more than 80° at large relative apertures. It has been found that this can be attained by meeting the following condition: The curvature of the two air lenses following each of the meniscus-shaped outer lenses in the direction of the centrally arranged diaphragm, is selected in such manner that the characteristic difference of radii of their limiting surfaces referred to the diverging surface of the negative outer lens, is on the side of the shorter conjugate larger than 140% of the corresponding value of the air lens curvature in the front member of the total objective, which is turned toward the side of the major conjugate.

In the appended drawings, the invention is illustrated by axial sections through the lenses in Figure 1. Lens groups I, II and III, IV arranged on two opposite sides of diaphragm B, as well as the radii of curvature (R), thicknesses (d) and air spaces (a) are consecutively numbered, starting on the side of the major conjugate, in the direction of the minor conjugate. The glasses used are characterized in the same consecutive order by their mean refractive numbers $n_d$ referring to the yellow spectral line of helium light and, in connection with their color dispersion, by their numerical value of the Abbe number $\nu$.

Figure 2:
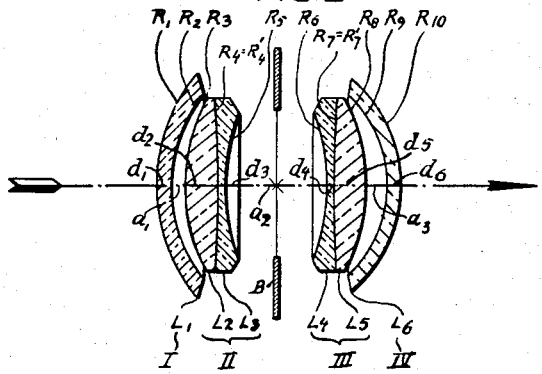

Figure 2 illustrates an embodiment of the invention for an equivalent focal length $f=150$ mm. in natural size, and the structure shown in this figure corresponds to the following numerical example. The data of this embodiment refer to a focal length of $l$, and the radii of lenses, as well as the thicknesses of lenses and air spaces measured on the optical axis, are stated in the same unit. The reference symbols of the numerical example are the same as used in the drawings.

The embodiment illustrated in the example is based on a partly symmetric structure and on a different sequence of glasses for the meniscus-shaped outer lenses, in order to illustrate that the new construction principle of the invention is capable of wide variation. The specific selection of radii may likewise considerably vary within the invention, particularly in diversion from a strictly symmetric structure. On the other hand, the example also shows possibilities of successfully using several surfaces of equal curvature and lenses of similar shape, in the new objective, the image field of which has an effective extent of 85° at these constructive simplifications, at a relative aperture of 1:4.7, which is an extremely high value in a wide-angle double anastigmat.

Numerical example

[f=1.000   Relative aperture: 1 : 4.7]

| | | | |
|---|---|---|---|
| $R_1 = +0.22544$ | $d_1 = 0.02180$ | $n_1 = 1.69842$ | $\nu_1 = 30.1$ |
| $R_2 = +0.19230$ | $a_1 = 0.01574$ | air | |
| $R_3 = +0.24219$ | $d_2 = 0.04238$ | $n_2 = 1.62094$ | $\nu_2 = 60.2$ |
| $R_4 = R'_4 = -1.57425$ | $d_3 = 0.01274$ | $n_3 = 1.52584$ | $\nu_3 = 51.3$ |
| $R_5 = +0.28821$ | $a_2 = 0.12957$ | Air, diaphragm space | |
| $R_6 = -0.28821$ | $d_4 = 0.01274$ | $n_4 = 1.52584$ | $\nu_4 = 51.3$ |
| $R_7 = R'_7 = +1.57425$ | $d_5 = 0.04238$ | $n_5 = 1.62094$ | $\nu_5 = 60.2$ |
| $R_8 = -0.24219$ | $a_3 = 0.02422$ | air | |
| $R_9 = -0.16106$ | $d_6 = 0.02180$ | $n_6 = 1.53250$ | $\nu_6 = 46.2$ |
| $R_{10} = -0.18237$ | | | |

In the above example $$\frac{R_3 - R_2}{R_2} = \frac{0.2419 - 0.19230}{0.19230} = 0.25944$$

i. e. 25.944% of $R_2$ and thus higher than 15% of $R_2$, and smaller than 85% of $R_2$.

Furthermore, $$\frac{R_8 - R_9}{R_9} = \frac{0.24219 - 0.16106}{0.16106} = 0.50373$$

i. e. 50.373% of $R_9$ and thus higher than 15% of $R_9$ and smaller than 85% of $R_9$.

The above numerical example also shows that the dimentions of the air lenses characterized by air spaces $a_1$ and $a_3$ ($a_3 = 0.02422$ and $a_1 = 0.01574$) are different, the double anastigmat embodying the invention being constructed in deviation from the principle of a strictly symmetrical structure.

Thereby, the outer lens $L_6$ on the image side, is more strongly curved toward the diaphragm than outer lens $L_1$ on the object side, as its radii of curvature $$R_9 = 0.16106 \text{ and } R_{10} = 0.18237$$

are shorter than the corresponding radii of curvature $$R_1 = 0.22544 \text{ and } R_2 = 0.19230$$

The longest radius of lens $L_6$, $R_{10} = 0.1823$ is even smaller, i. e. shorter than the smallest radius $R_2 = 0.19230$ of lens $L_1$.

Moreover, the air lens corresponding to air space $a_3$ of the objective embodying the invention has a stronger curvature of $$\frac{R_8 - R_9}{R_9} = 0.50373$$

in the above numerical example, than the air lens corresponding to air space $a_1$, having a curvature $$\frac{R_3 - R_2}{R_2} = 0.25941$$

Said value of 0.50373 is by $$\frac{0.50373}{0.25944} = 1.9416$$

i. e. 194.16% larger than said other value 0.25944. Thus, the amount of curvature of the air lens on the side of the minor conjugate, is more than 140% higher than the corresponding air lens on the side of the major conjugate.

The above example and the numerical values of the table also show that the figures corresponding to members II and III, i. e.

$R_3$ and $R_8$
$R_4 = R'_4$ and $R_7 = R'_7$
$R_5$ and $R_6$ as well as $d_2$ and $d_5$
$d_3$ and $d_4$ and also $n_2$ and $n_5$
$n_3$ and $n_4$ and $\nu_2$ and $\nu_5$
$\nu_3$ and $\nu_4$ are selected to be equal, so that these meniscus-shaped, converging cemented members II and III, which are concave toward the diaphragm, form the symmetric part of the total objective.

The objectives embodying the present invention meet the following conditions, wherein $\varphi_I$, $\varphi_{II}$, $\varphi_{III}$ and $\varphi_{IV}$ stand for the refractive power of the individual lens members of the objective system and $\Phi$ stands for the equivalent refractive power of the objective:

I.   $-0.35\ \Phi < \varphi_I < -0.70\ \Phi$
II.  $+0.60\ \Phi < \varphi_{II} < +1.00\ \Phi$
III. $+0.60\ \Phi < \varphi_{III} < +1.00\ \Phi$
IV.  $-0.25\ \Phi < \varphi_{IV} < -0.55\ \Phi$ The above distribution of the refractive power values in individual members I–IV of the objective is brought about by a structure and arrangement of individual elements $L_1$–$L_6$ according to the following table:

$$I \begin{cases} 0.18\ f < R_1 < 0.28\ f \\ 0.010\ f < d_1 < 0.080\ f \\ 0.15\ f < R_2 < 0.24\ f \end{cases} L_1$$

$$0.005\ f < a_1 < 0.065\ f$$

$$II \begin{cases} 0.20\ f < R_3 < 0.30\ f \\ 0.020\ f < d_2 < 0.090\ f \\ 0.90\ f < \pm R_4, R'_4 < \infty \\ 0.005\ f < d_3 < 0.050\ f \\ 0.23\ f < R_5 < 0.36\ f \end{cases} \begin{matrix}L_2\\ \\ \\L_3\\ \end{matrix}$$

$$0.070\ f < a_2 < 0.210\ f \text{ Diaphragm space}$$

$$III \begin{cases} 0.23\ f < -R_6 < 0.36\ f \\ 0.005\ f < d_4 < 0.050\ f \\ 0.90\ f < \pm R_7, R'_7 < \infty \\ 0.020\ f < d_5 < 0.090\ f \\ 0.20\ f < -R_8 < 0.30\ f \end{cases} \begin{matrix}L_4\\ \\ \\L_5\\ \end{matrix}$$

$$0.005\ f < a_3 < 0.065\ f$$

$$IV \begin{cases} 0.13\ f < -R_9 < 0.19\ f \\ 0.010\ f < d_6 < 0.080\ f \\ 0.15\ f < -R_{10} < 0.23\ f \end{cases} L_6$$

What is claimed is:

1. Wide angle field objective consisting of six individual lenses, three of which form a front part and three form a rear part, said front part and rear part being arranged on two opposite sides of a centrally located diaphragm in the following manner: said diaphragm is enclosed by two converging cemented lens members spaced from the diaphragm; each of said cemented lens members being followed by a diverging outer lens located in terminal positions in the objective; on both sides of the diaphragm, the cemented lens member adjacent the diaphragm, as well as the outer lens turned away from the diaphragm are designed as menisci and their glass-air surfaces are concave toward the enclosed diaphragm, so that all outer lens surfaces of the total objective, bordering on air, are concave toward the diaphragm; each, the front part and the rear part of the objective comprising a converging, meniscus-shaped cemented lens member, which is concave toward the diaphragm and consists of a diverging lens of unequal curvature united with a converging lens of likewise unequal curvature by a converging cemented surface; each of said cemented lens members being separated from the outer diverging meniscus-shaped terminal lens, which is turned away from the diaphragm, by an air space having the shape of a meniscus-shaped converging lens, which is likewise concave toward the diaphragm, and the curvature of which meets the following conditions:

(a) $$\frac{R_3-R_2}{R_2}>0.150$$

(b) $$\frac{R_8-R_9}{R_9}>0.150$$

(c) $$\frac{R_3-R_2}{R_2}<0.850$$

(d) $$\frac{R_8-R_9}{R_9}<0.850$$

wherein $R_3$ is the radius of curvature of the surface limiting the air space located in the front part of the objective, between the cemented lens and the individual terminal lens, on the side of the cemented lens and $R_2$ is the radius of curvature of the surface limiting this air space on the side of the terminal lens; $R_8$ is the radius of curvature of the surface limiting the air space located in the rear part of the objective, between the cemented lens and the individual terminal lens, on the side of the cemented lens and $R_9$ is the radius of curvature of the surface limiting this air space on the side of the terminal lens.

2. Wide angle field objective, as claimed in claim 1, in which the lenses of the objective form a double anastigmat of the following refractive powers:

I. $-0.35\ \Phi<\varphi_I<-0.70\ \Phi$
II. $+0.60\ \Phi<\varphi_{II}<+1.00\ \Phi$
III. $+0.60\ \Phi<\varphi_{III}<+1.00\ \Phi$
IV. $-0.25\ \Phi<\varphi_{IV}<-0.55\ \Phi$ the curvature of the air lens located in the front part of the objective between the cemented lens and the individual terminal lens, being different from the curvature of the air lens located in the rear part of the objective between the cemented lens and the individual terminal lens wherein $\varphi_I, \varphi_{II}, \varphi_{III}, \varphi_{IV}$ stand for the refractive power of the individual lens members of the objective system and $\Phi$ stands for the equivalent refractive power of the objective.

3. Wide angle field objective, as claimed in claim 1, in which the lenses of the objective form a double anastigmat and the curvature of the air lens located in the front part of the objective between the cemented lens and the individual terminal lens, is different from the curvature of the air lens located in the rear part of the objective between the cemented lens and the individual terminal lens in such manner that $$\frac{R_3-R_2}{R_2}>0.25\frac{R_8-R_9}{R_9}$$

$$\frac{R_3-R_2}{R_2}<0.85\frac{R_8-R_9}{R_9}$$

the radii of curvature of the meniscus-shaped diverging lens limiting the total objective on the side of the minor conjugate being shorter than the corresponding radii of the meniscus-shaped diverging lens limiting the total objective on the side of the major conjugate.

4. Wide angle field objective consisting of six individual lenses, three of which form a front part and three form a rear part, said front part and rear part being arranged on two opposite sides of a centrally located diaphragm in the following manner: said diaphragm is enclosed by two converging cemented lens members spaced from the diaphragm; each of said cemented lens members being followed by a diverging outer lens located in terminal positions in the objective; on both sides of the diaphragm, the cemented lens member adjacent the diaphragm, as well as the outer lens turned away from the diaphragm are designed as menisci and their glass-air surfaces are concave toward the enclosed diaphragm, so that all outer lens surfaces of the total objective, bordering on air, are concave toward the diaphragm; each, the front part and the rear part of the objective comprising a converging, meniscus-shaped cemented lens member, which is concave toward the diaphragm and consists of a diverging lens of unequal curvature united with a converging lens of likewise unequal curvature by a converging cemented surface; each of said cemented lens members being separated from the outer diverging meniscus-shaped terminal lens, which is turned away from the diaphragm, by an air space having the shape of a meniscus-shaped converging lens, which is likewise concave toward the diaphragm, and the curvature of which meets the following conditions:

(a) $$\frac{R_3-R_2}{R_2}>0.150$$

(b) $$\frac{R_8-R_9}{R_9}>0.150$$

(c) $$\frac{R_3-R_2}{R_2}<0.850$$

(d) $$\frac{R_8-R_9}{R_9}<0.850$$

wherein $R_3$ is the radius of curvature of the surface limiting the air space located in the front part of the objective, between the cemented lens and the individual terminal lens, on the side of the cemented lens and $R_2$ is the radius of curvature of the surface limiting this air space on the side of the terminal lens; $R_8$ is the radius of curvature of the surface limiting the air space located in the rear part of the objective, between the cemented lens and the individual terminal lens, on the side of the cemented lens and $R_9$ is the radius of curvature of the surface limiting this air space on the side of the terminal lens; the wide angle field objective meeting also the following conditions:

I. $-0.35\ \Phi<\varphi_I<-0.70\ \Phi$
II. $+0.60\ \Phi<\varphi_{II}<+1.00\ \Phi$
III. $+0.60\ \Phi<\varphi_{III}<+1.00\ \Phi$
IV. $-0.25\ \Phi<\varphi_{IV}<-0.55\ \Phi$ wherein $\varphi_I, \varphi_{II}, \varphi_{III}, \varphi_{IV}$ stand for the refractive power of the individual lens members of the objective system and $\Phi$ stands for the equivalent refractive power of the objective.

5. Wide angle field objective consisting of six individual lenses, three of which form a front part and three form a rear part, said front part and rear part being arranged on two opposite sides of a centrally located diaphragm in the following manner: said diaphragm is enclosed by two converging cemented lens members spaced from the diaphragm; each of said cemented lens members being followed by a diverging outer lens located in terminal positions in the objective; on both sides of the diaphragm, the cemented lens member adjacent the diaphragm, as well as the outer lens turned away from the diaphragm are designed as menisci and their glass-air surfaces are concave toward the enclosed diaphragm, so that all outer lens surfaces of the total objective, bordering on air, are concave toward the diaphragm; each, the front part and the rear part of the objective comprising a converging, meniscus-shaped cemented lens member, which is concave toward the diaphragm and consists of a diverging lens of unequal curvature united with a converging lens of likewise unequal curvature by a converging cemented surface; each of said cemented lens members being separated from the outer diverging meniscus-shaped terminal lens, which is turned away from the diaphragm, by an air space having the shape of a meniscus-shaped converging lens, which is likewise concave toward the diaphragm, and the curvature of which meets the following conditions:

(a) $$\frac{R_3-R_2}{R_2}>0.150$$

(b) $$\frac{R_8-R_9}{R_9}>0.150$$

(c) $$\frac{R_3-R_2}{R_2}<0.850$$

(d) $$\frac{R_8-R_9}{R_9}<0.850$$

wherein $R_3$ is the radius of curvature of the surface limiting the air space located in the front part of the objective, between the cemented lens and the individual terminal lens, on the side of the cemented lens and $R_2$ is the radius of curvature of the surface limiting this air space on the side of the terminal lens; $R_8$ is the radius of curvature of the surface limiting the air space located in the rear part of the objective, between the cemented lens and the individual terminal lens, on the side of the cemented lens and $R_9$ is the radius of curvature of the surface limiting this air space on the side of the terminal lens; the wide angle field objective meeting also the following conditions:

$$I \begin{cases} 0.18\ f< & R_1 & <0.28\ f \\ 0.10\ f< & d_1 & <0.080\ f \\ 0.15\ f< & R_2 & <0.24\ f \end{cases} L_1$$

$$0.005\ f< \quad a_1 \quad <0.065\ f$$

$$II \begin{cases} 0.20\ f< & R_3 & <0.30\ f \\ 0.020\ f< & d_2 & <0.090\ f \\ 0.90\ f< \pm R_4, R'_4 < & \infty \\ 0.005\ f< & d_3 & <0.050\ f \\ 0.23\ f< & R_5 & <0.36\ f \end{cases} \begin{matrix} L_2 \\ \\ \\ L_3 \end{matrix}$$

$$0.070\ f< \quad a_2 \quad <0.210\ f \text{ Diaphragm space}$$

$$III \begin{cases} 0.23\ f< -R_6 & <0.36\ f \\ 0.005\ f< & d_4 & <0.050\ f \\ 0.90\ f< \pm R_7, R'_7 < & \infty \\ 0.020\ f< & d_5 & <0.090\ f \\ 0.20\ f< -R_8 & <0.30\ f \end{cases} \begin{matrix} L_4 \\ \\ \\ L_5 \end{matrix}$$

$$0.005\ f< \quad a_3 \quad <0.065\ f$$

$$IV \begin{cases} 0.13\ f< -R_9 & <0.19\ f \\ 0.010\ f< & d_6 & <0.080\ f \\ 0.15\ f< -R_{10} & <0.23\ f \end{cases} L_6$$

wherein f stands for the equivalent focal length, $R_1$, $R_2$, $R_3$ ... etc. stand for the radii of curvature, $d_1$, $d_2$, $d_3$ ... etc. stand for the thicknesses of the lens elements and $a_1$, $a_2$, $a_3$ for the air spaces consecutively numbered, starting on the side of the major conjugate, in the direction toward the minor conjugate.

6. Wide angle field objective consisting of six individual lenses, three of which form a front part and three form a rear part, said front part and rear part being arranged on two opposite sides of a centrally located diaphragm in the following manner: said diaphragm is enclosed by two converging cemented lens members spaced from the diaphragm; each of said cemented lens members being followed by a diverging outer lens located in terminal positions in the objective; on both sides of the diaphragm, the cemented lens member adjacent the diaphragm, as well as the outer lens turned away from the diaphragm are designed as menisci and their glass-air surfaces are concave toward the enclosed diaphragm, so that all outer lens surfaces of the total objective, bordering on air, are concave toward the diaphragm; each, the front part and the rear part of the objective comprising a converging, meniscus-shaped cemented lens member, which is concave toward the diaphragm and consists of a diverging lens of unequal curvature united with a converging lens of likewise unequal curvature by a converging cemented surface; each of said cemented lens members being separated from the outer diverging meniscus-shaped terminal lens, which is turned away from the diaphragm, by an air space having the shape of a meniscus-shaped converging lens, which is likewise concave toward the diaphragm, and the curvature of which meets the following conditions:

(a) $$\frac{R_3-R_2}{R_2}>0.150$$

(b) $$\frac{R_8-R_9}{R_9}>0.150$$

(c) $$\frac{R_3-R_2}{R_2}<0.850$$

(d) $$\frac{R_8-R_9}{R_9}<0.850$$

wherein $R_3$ is the radius of curvature of the surface limiting the air space located in the front part of the objective, between the cemented lens and the individual terminal lens, on the side of the cemented lens and $R_2$ is the radius of curvature of the surface limiting this air space on the side of the terminal lens; $R_8$ is the radius of curvature of the surface limiting the air space located in the rear part of the objective, between the cemented lens and the individual terminal lens, on the side of the cemented lens and $R_9$ is the radius of curvature of the surface limiting this air space on the side of the terminal lens; the lenses of the wide angle field objective forming a double anastigmat and the curvature of the air lens located in the front part of the objective between the cemented lens and the individual terminal lens, being different from the curvature of the air lens located in the rear part of the objective between the cemented lens and the individual terminal lens; the curvatures of surfaces limiting the air spaces located between the terminal lens and the cemented lens, on the side of the longer conjugate, as well as on the side of the shorter conjugate, being selected in such manner that they meet the condition:

$$\frac{R_8-R_9}{R_9}>1.40 \cdot \frac{R_3-R_2}{R_2}$$

the wide angle field objective meeting also the following conditions:

I.   $-0.35\ \Phi<\varphi_I<-0.70\ \Phi$
II.  $+0.60\ \Phi<\varphi_{II}<+1.00\ \Phi$
III. $+0.60\ \Phi<\varphi_{III}<+1.00\ \Phi$
IV.  $-0.25\ \Phi<\varphi_{IV}<-0.55\ \Phi$ wherein $\varphi_I$, $\varphi_{II}$, $\varphi_{III}$, $\varphi_{IV}$ stand for the refractive power of the individual lens members of the objective system and $\Phi$ stands for the equivalent refractive power of the objective.

7. Wide angle field objective, as claimed in claim 6, which meets also the following conditions:

$$I \begin{cases} 0.18\ f< & R_1 & <0.28\ f \\ 0.10\ f< & d_1 & <0.080\ f \\ 0.15\ f< & R_2 & <0.24\ f \end{cases} L_1$$

$$0.005\ f< \quad a^1 \quad <0.065\ f$$

$$II \begin{cases} 0.20\ f< & R_3 & <0.30\ f \\ 0.020\ f< & d_2 & <0.90\ f \\ 0.90\ f< \pm R_4, R'_4 < & \infty \\ 0.005\ f< & d_3 & <0.050\ f \\ 0.23\ f< & R_5 & <0.36\ f \end{cases} \begin{matrix} L_2 \\ \\ \\ L_3 \end{matrix}$$

$$\text{III} \begin{cases} 0.70\ f < a_2 < 0.210\ f\ \text{Diaphragm space} \\ \begin{bmatrix} 0.23\ f < -R_6 < 0.36\ f \\ 0.005\ f < d_4 < 0.050\ f \end{bmatrix} L_4 \\ 0.90\ f < \pm R_7, R'_7 < \infty \\ \begin{bmatrix} 0.020\ f < d_5 < 0.090\ f \\ 0.20\ f < -R_8 < 0.30\ f \end{bmatrix} L_5 \\ 0.005\ f < a_3 < 0.065\ f \end{cases}$$

$$\text{IV} \begin{cases} 0.13\ f < -R_9 < 0.19\ f \\ 0.010\ f < d_6 < 0.080\ f \\ 0.15\ f < -R_{10} < 0.23\ f \end{cases} L_6$$

wherein f stands for the equivalent focal length, $R_1$, $R_2$, $R_3$ ... etc. stand for the radii of curvature, $d_1$, $d_2$, $d_3$ ... etc. stand for the thicknesses of the lens elements and $a_1$, $a_2$, $a_3$ for the air spaces consecutively numbered, starting on the side of the major conjugate, in the direction toward the minor conjugate.

References Cited in the file of this patent

UNITED STATES PATENTS

| | | |
|---|---|---|
| 1,777,262 | Hasselkus et al. | Sept. 30, 1930 |
| 1,792,917 | Merte | Feb. 17, 1931 |
| 2,475,938 | Altman | July 12, 1949 |
| 2,516,724 | Roossinov | July 25, 1950 |

FOREIGN PATENTS

| | | |
|---|---|---|
| 133,957 | Germany | Sept. 27, 1902 |
| 194,546 | Germany | Jan. 27, 1908 |
| 135,853 | Great Britain | Nov. 26, 1919 |
| 322,506 | Germany | July 1, 1920 |
| 900,090 | France | Sept. 18, 1944 |